United States Patent [19]
Greenwood

[11] 4,116,531
[45] Sep. 26, 1978

[54] FIBER OPTIC SWITCH ARRANGEMENT

[75] Inventor: John C. Greenwood, Harlow, England

[73] Assignee: International Standard Electric Corporation, New York, N.Y.

[21] Appl. No.: 783,875

[22] Filed: Apr. 1, 1977

[51] Int. Cl.² ............................................. G02B 5/14
[52] U.S. Cl. ............................ 350/96.20; 340/365 A; 350/96.29; 350/360
[58] Field of Search ............... 350/96 C, 96 R, 96.20, 350/360; 340/365 P, 365 A; 250/229

[56] References Cited

U.S. PATENT DOCUMENTS

| 3,526,775 | 9/1970 | Friedrich et al. | 340/365 P |
| 3,673,327 | 6/1972 | Johnson et al. | 340/365 P |

OTHER PUBLICATIONS

Kaser et al., IBM Tech. Disc. Bull, "Push-Button Switches for Optical Fibres," vol. 16, No. 8. Jan. 1974, p. 2452.
Dimmick et al., IBM Tech. Disc. Bull., "Optical Keyboard," vol. 16, No. 6, Nov. '1973, pp. 1785–1786.

*Primary Examiner*—John K. Corbin
*Assistant Examiner*—Stewart Levy
*Attorney, Agent, or Firm*—John T. O'Halloran; Peter C. Van Der Sluys

[57] ABSTRACT

A fiber optic switch utilizes an unclad light guide arranged adjacent to a diaphragm of absorbing material. Operation of a push-button presses the diaphragm into contact with the light guide for attenuating the light. Several light guides may be employed to provide an *n*-of-*m* code switch matrix.

2 Claims, 4 Drawing Figures

FIBER OPTIC SWITCH ARRANGEMENT

FIELD OF THE INVENTION

This invention relates to optical key switches and in particular to a push-button switch arrangement for selectively controlling light travelling along an unclad region of an optical fibre.

SUMMARY OF THE INVENTION

According to the invention there is provided an optical fibre switch arrangement, including an unclad fibre through which light is transmitted, means for supporting said fibre without substantially attenuating the light propagated therein, and means for selectively contacting a portion of the surface of the fibre with a resilient light absorbing material so as to attenuate the propagated light.

According to the invention there is further provided an optical fibre matrix switch arrangement, including a rigid substrate having a flat surface, a coating of relatively low refractive index on said surface and a substantially parallel array of light guides of a selectively high refractive index arranged on the coating. An elastic diaphragm is mounted adjacent the light guides and an array of bar members is arranged substantially perpendicular to the light guides. Each of the fibres is selectively coated along its length with a protective layer of low refractive material, and the bar members and protective coatings are so arranged that depression of any one bar member distorts the diaphragm into contact with the light guides thus attenuating light only in the guides that have no coating in that region so as to provide an n out of m switch code.

DESCRIPTION OF THE PREFERRED EMBODIMENT

Figure 1:
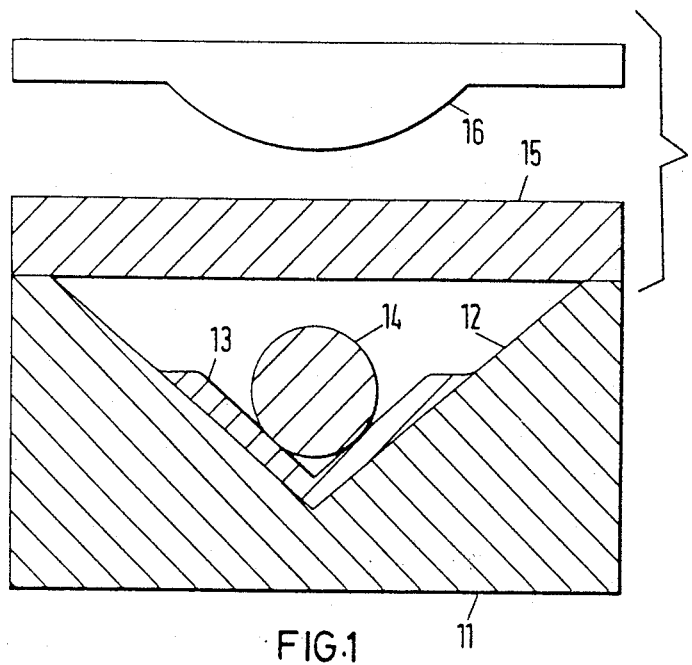
FIG. 1 is a cross sectional view of the inventive switch in an "off" position.
Figure 2:
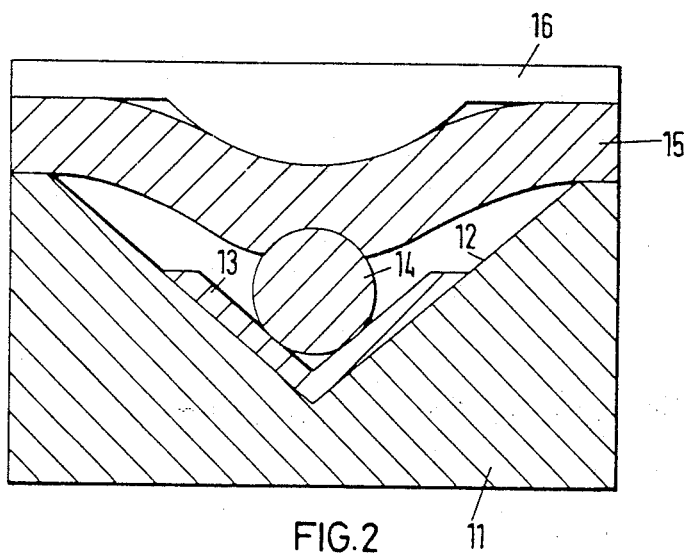
FIG. 2 is a cross sectional view of the switch of FIG. 1 in an "on" position.

Referring to FIGS. 1 and 2, the switch assembly includes an elongated channel member 11 having a V-shaped longitudinal groove 12 the surface of which groove is coated with a layer 13 of a transparent cladding material. The channel member 11 supports an unclad optical fibre 14, which fibre is located in the V groove 12. The transparent coating 13, which may be made from a plastics material, has a refractive index significantly lower than that of the fibre 14 so as to minimise light losses from the fibre. In some applications the faces of the V groove 12 may be highly polished and the coating 13 may then be dispensed with.

The V groove 12 is bridged by a light absorbing elastic, e.g. polyurethane diaphragm member 15 adjacent which a push-button or key 16 is mounted. Depression of the push-button 16 deforms the elastic diaphragm member 15 as shown in FIG. 2 and forces it into abutment with the surface of the fibre 14 so that light travelling along the fibre is severely attenuated.

Figure 3:
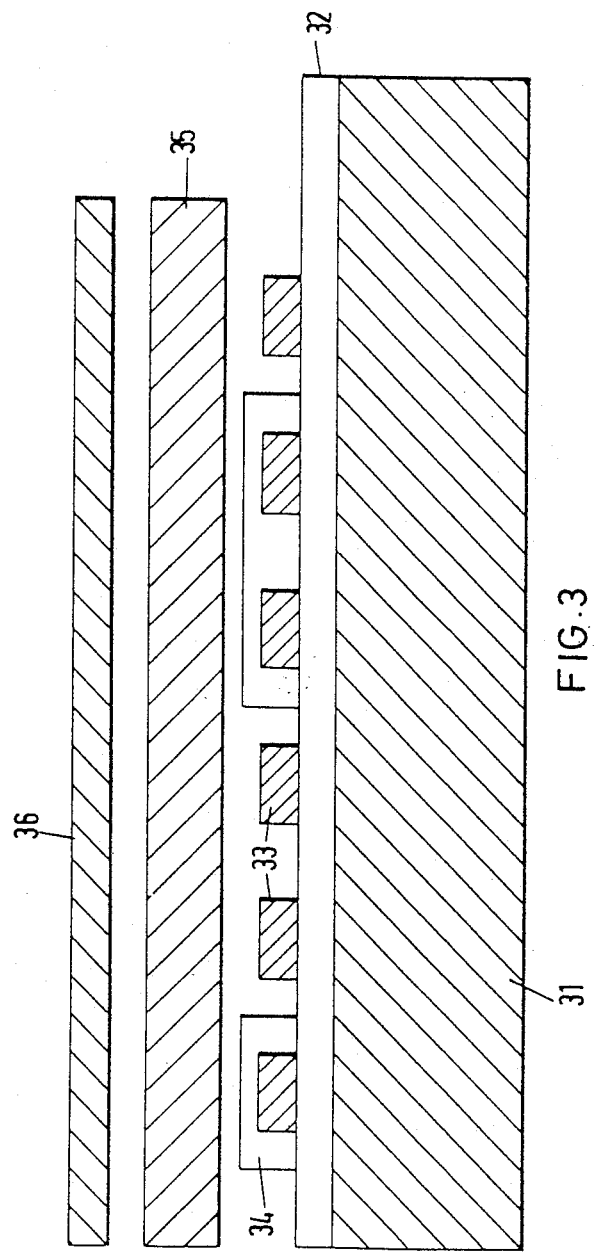
FIG. 3 is a cross sectional view of a plurality of the switches of this invention for use in a switching matrix.

FIG. 3 is a schematic cross sectional view of an optical fibre switch matrix employing the principle of the switch arrangement of FIGS. 1 and 2. A flat baseplate 31 is coated with a layer 32 of a transparent material of relatively low refractive index. An array of light guides 33 of relatively high refractive index material is arranged on the layer 32.

At various points along the length of the switch matrix selected ones of the light guides 33 are coated with a layer 34 of the low refractive index material as shown in FIG. 3. An elastic light absorbing diaphragm 35 is mounted above the array of light guides 33 and is movable into abutment with the light guides via an array of switch bars 36, the switch bars being arranged substantially perpendicular to the light guides. Operation of any one switch bar 36 forces the corresponding portion of the diaphragm 35 into contact only with the individual light guides 33 that are unprotected by the low refractive index material 34 in that region thus providing an n out of m switch code arrangement.

Both the layer 32 and the light guides 33 may advantageously be formed from plastics materials, the latter e.g. by deposition through a lithographic mask.

Figure 4:
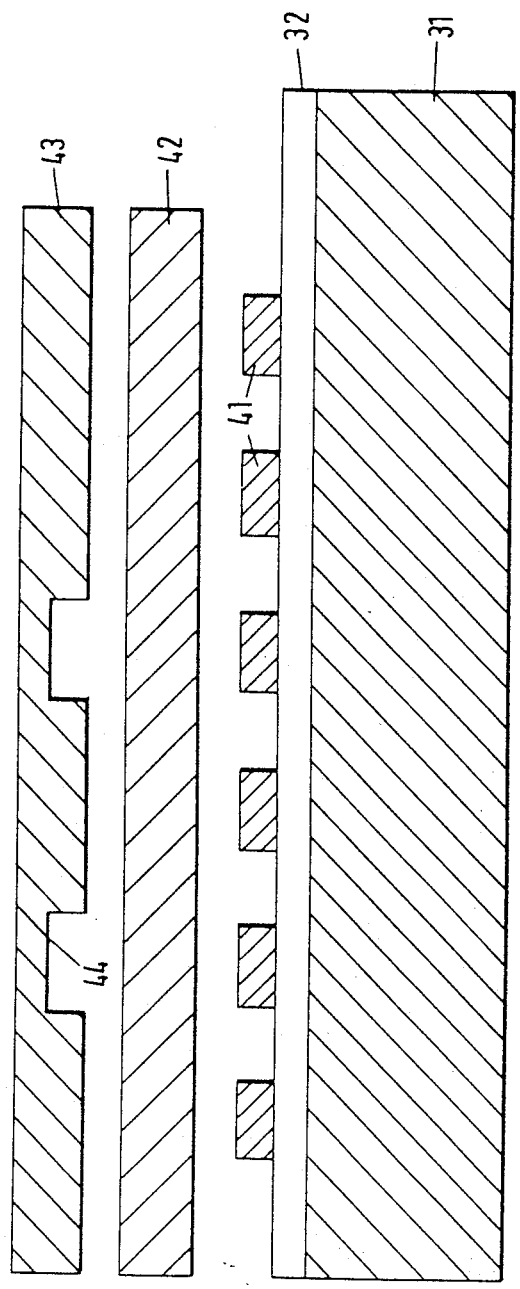
FIG. 4 is a further embodiment of the derrie of FIG. 3.

The switch matrix shown in FIG. 4 is similar to that of FIG. 3 except that the parallel light guides 41 are unprotected throughout their length. A flexible diaphragm 42 arranged adjacent the light guides 41 is pressed into contact with selected light guides by means of an array of switch bars 43 each bar having cut-outs 44 arranged according to the switch code to be generated.

It is to be understood that the foregoing description of specific examples of this invention is made by way of example only and is not to be considered as a limitation on its scope.

I claim:

1. An optical fibre matrix switch arrangement comprising:
    a rigid substrate having a flat surface;
    a coating of relatively low refractive index material on said surface;
    a substantially parallel array of light guides of a relatively high refractive index arranged on the coating, each of said light guides selectively coated along portions of its length with a protective layer of low index material;
    an elastic diaphragm mounted adjacent the light guides; and
    an array of bar members arranged substantially perpendicular to the light guides, each of said bar members being arranged relative to said selectively coated portions of the light guides so that depression of any one bar member distorts the diaphragm into contact with the light guides thereby attenuating light only in the guides that have no coating in the region of contact so as to provide an n out of m switch code.

2. An optical fibre matrix switch arrangement, comprising:
    a rigid substrate having a flat surface;
    a coating of relatively low refractive index material on said surface;
    a substantially parallel array of light guides of a relatively high refractive index arranged on the coating;
    an elastic diaphragm mounted adjacent the light guides; and
    an array of bar members arranged substantially perpendicular to the light guides, each of said bar members being formed and arranged relative to said light guides so that depression of any one bar member selectively distorts the diaphragm into contact with predetermined light guides, thereby attenuating light only in the predetermined light guides so as to provide an n out of m switch code.

* * * * *